United States Patent [19]
Kobayashi et al.

[11] Patent Number: 5,963,518
[45] Date of Patent: Oct. 5, 1999

[54] APPARATUS FOR REPRODUCING DIGITAL SIGNAL

[75] Inventors: Hideki Kobayashi, Tokorozawa; Kiyoshi Tateishi, Tsurugashima, both of Japan

[73] Assignee: Pioneer Electronic Corporation, Tokyo, Japan

[21] Appl. No.: 08/893,037

[22] Filed: Jul. 15, 1997

[30] Foreign Application Priority Data

Jul. 16, 1996 [JP] Japan .................................... 8-205251

[51] Int. Cl.⁶ ...................................................... G11B 7/00
[52] U.S. Cl. ................................ 369/48; 369/54; 369/58; 369/59; 369/124
[58] Field of Search ................................ 369/124, 54, 59, 369/47, 44.35, 44.36, 48, 58

[56] References Cited

U.S. PATENT DOCUMENTS

| | | |
|---|---|---|
| 5,455,813 | 10/1995 | Hayashi .................................... 369/124 |
| 5,606,540 | 2/1997 | Hayashi .................................... 369/59 |
| 5,663,945 | 9/1997 | Hayashi et al. .......................... 369/124 |
| 5,677,802 | 10/1997 | Saila et al. ................................ 369/59 |
| 5,703,853 | 12/1997 | Horigome et al. ...................... 369/124 |
| 5,742,576 | 4/1998 | Hayashi et al. .......................... 369/59 |

*Primary Examiner*—Thang V. Tran
*Attorney, Agent, or Firm*—Sughrue, Mion, Zinn, MacPeak & Seas, PLLC

[57] ABSTRACT

An apparatus for reproducing a digital signal which converts a signal read from a recording medium on which a digital signal is recorded into a series of sample values with an A/D converter, detects a phase error from the series of sample values, generates a gain phase error signal by providing the phase error with a predetermined gain, corrects the phase of a clock signal based on the gain phase error signal, and uses the clock signal with the phase thereof corrected as a sampling clock.

9 Claims, 12 Drawing Sheets

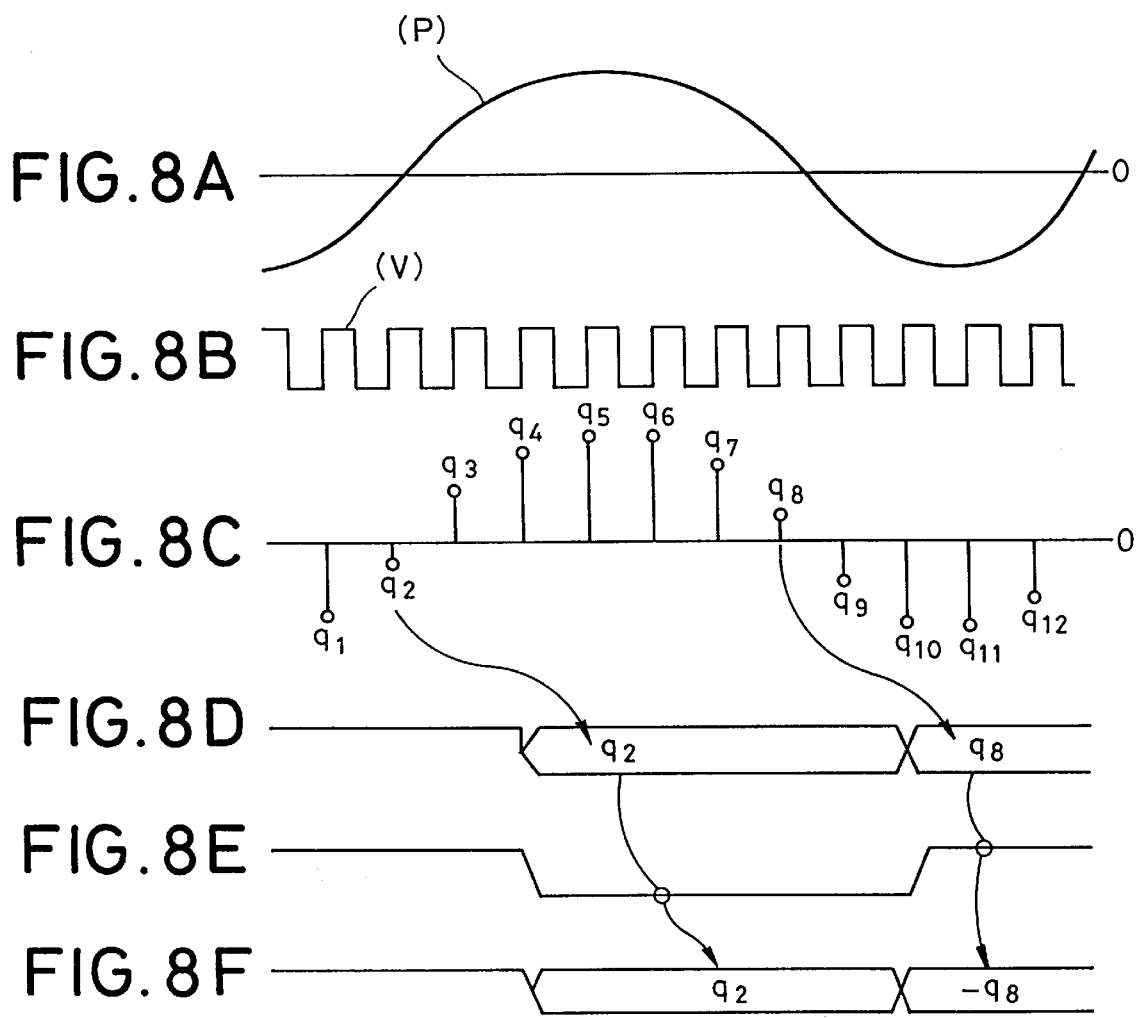

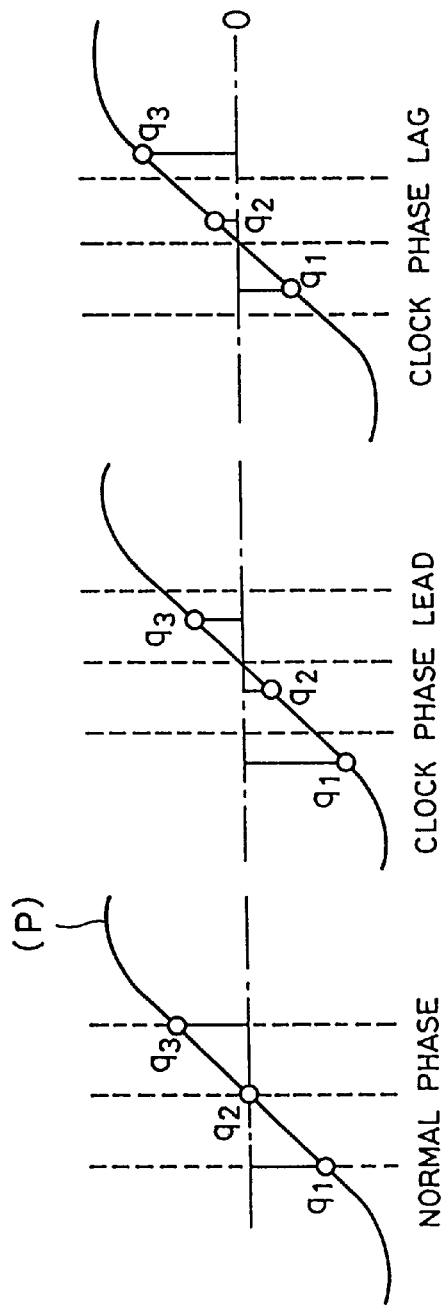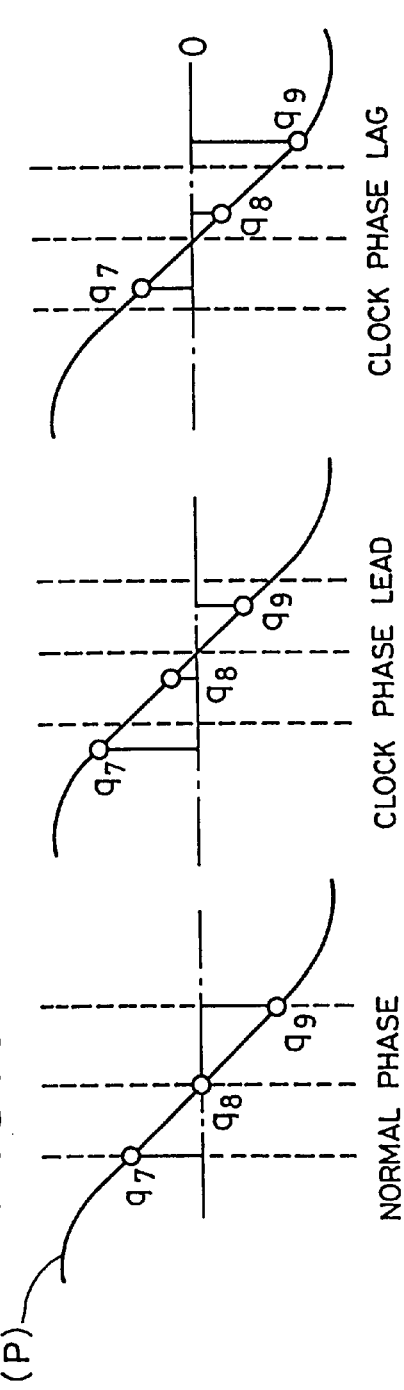

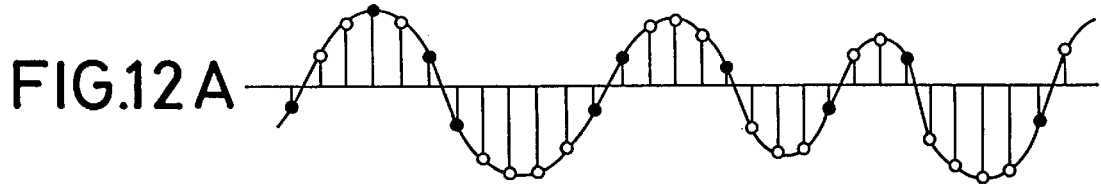
FIG.12A
FIG.12B
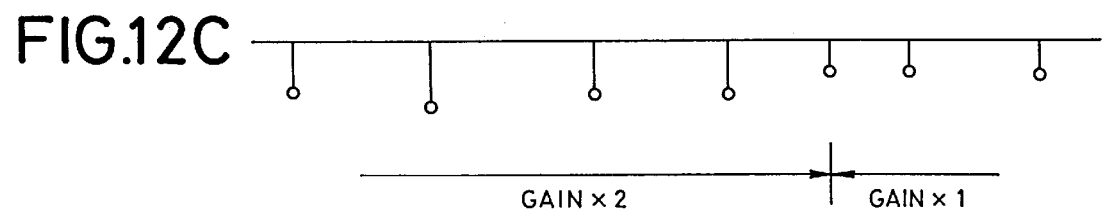
FIG.12C
FIG.13
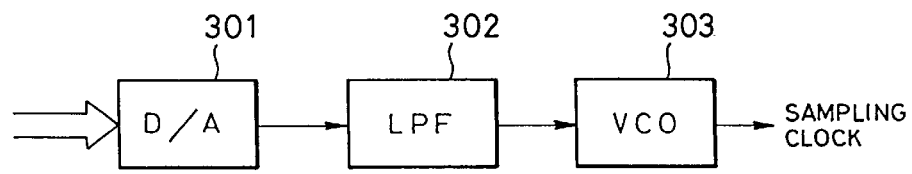

APPARATUS FOR REPRODUCING DIGITAL SIGNAL

BACKGROUND OF THE INVENTION

1. Field of the Invention

The present invention relates to an apparatus for reproducing a digital signal recorded on a recording medium.

2. Description of the Related Art

FIG. 1 illustrates a configuration of clock generation means which has been used in an optical disc player such as a CD (compact disc) player. An optical disc 2 is driven by a spindle motor 3 for rotation. Information stored on the optical disc 2 is read by a pick-up 4. An information signal reproduced from the pick-up 4 is amplified by an amplifier 5 and input to a binary slice circuit 6 which compares the read signal with a predetermined value to convert it into a binary pulse.

The binary pulse is compared with a reproduction clock generated by a VCO (voltage-controlled oscillator) 10 in a phase error detection circuit 8, and a resultant phase error is represented by a PWM (pulse width modulation) signal which is smoothed by an LPF (low-pass filter) 9 to provide an input voltage to the VCO 10. The VCO 10 reproduces a reproduction clock corresponding to the input voltage, and the output of the binary slice circuit 6 is sampled by a sampling circuit 7 to obtain a binary data output 11.

For example, in the case that a disc played by a CD-R (CD-Recordable) player is not only a CD-R but also a CD, there is a difference between their reproduced signals in the waveform at rising edges. This is attributable to a difference between their pit shapes resulting from a difference between the wavelength of a laser used for recording the CD and the wavelength used in recording the CD-R.

Since a phase error signal indicative of a phase error is generated by detecting signals in the neighborhood of edges of the signal waveforms, if there is a difference between the signal waveforms in the rise of edges, different phase error signals can be generated for identical phase errors.

Further, phase error signals can be adversely affected by noises when the gradient at edges of the signal waveforms is gentle. Therefore, a servo loop optimized for one of those discs will not act as the optimum loop for the other disc. Thus, the speed at which the reproduction clock is pulled into the optimum clock depends on disc types.

To solve this problem, a loop gain switching circuit as shown in FIG. 3 is used. Referring to FIG. 3, in the loop gain switching circuit, a phase error signal supplied to an input 902 is issued from an output 903 after being subjected to appropriate gain processing which is performed by switching a variable gain filter formed by the gain of an operational amplifier 901, a capacitance C1, and resistors R1, R3 or resistors R2, R4 with switches S1 and S2.

The speed at which the reproduction clock reaches the optimum clock may be adjusted by switching the gain of a loop filter depending on the disc by providing an LPF portion with gain switching means S1 and S2 as in the loop gain switching circuit shown in FIG. 3. However, analog switches like the switches S1 and S2 make shock and delay at the time of switching, which can cause a fluctuation in an input voltage to a VCO, thereby adversely affecting the reproduced clock.

Further, some discs have a recording area divided into information areas and servo areas as shown in FIG. 2. In such a case, a fixed pattern as indicated by As is recorded in each servo area, and the response speed must be increased in this section to introduce a lock state of a PLL (phase locked loop) quickly. In the information area indicated by Ad, it is necessary to achieve a slower response to prevent noises and the like from making the clock unstable.

In a continuous control system configuration to achieve this, as shown in FIG. 3, the loop gain is switched by an LPF such that the clock is quickly introduced into the servo area through expansion of the band of the LPF and such that the band is narrowed for the information area to suppress influence of noises and drop-outs if any.

However, a problem has arisen in that loop gain switching using analog switches or the like suffers from shock and delay at the time of switching, and this can cause a fluctuation in an input voltage to a VCO which adversely affects the reproduced clock and makes it difficult to perform quick access.

In addition, loop gain switching using an LPF may fail to provide a desired loop gain because of errors in each of elements such as R1 through R4 shown in FIG. 3. Thus, the loop gain switching at an LPF portion is susceptible to errors, although easy to implement. Loop gain switching can not be easily performed in a phase error detection portion because it outputs a PWM signal. Further, variations between disc layers and between disc types have also resulted in difficulties for continuous control systems in enabling quick access.

Furthermore, when a drop-out is caused by a scratch, fingerprint or the like, the resultant reproduced read signal is different from the correct signal recorded on the disc. Analog signal processing in an attempt to eliminate a phase error at the time of such a drop-out will fail because an analog switch or the like can not accurately eliminate it due to switching noises and the like. Thus, the resultant clock will not be accurate.

SUMMARY OF THE INVENTION

According to the present invention, there is provided an apparatus for reproducing a digital signal from a signal read from a recording medium on which the digital signal is recorded comprising: reading means for reading a signal from the recording medium; an A/D converter for sequentially sampling the read signal in response to a sampling clock to convert the sampled signal into a series of sample values; a decoding means for decoding the digital signal based on the series of sample values to output a reproduced digital signal; phase error detection means for detecting a phase error from the series of sample values; memory means for storing a predetermined gain; gain setting means for outputting a gain phase error signal by providing the phase error with the predetermined gain; and clock generation means for generating a clock signal which has been subjected to phase correction based on the gain phase error signal as the sampling clock.

According to the present invention, in an apparatus for reproducing a digital signal, a read signal is converted into a series of sample values; a phase error is detected from the series of sample values; and memory means for storing a predetermined gain and gain setting means for outputting a gain phase error are provided to generate a clock signal which has been subjected to phase correction based on the gain phase error signal as a sampling clock. Thus, any delay and shock associated with gain switching are eliminated to make it possible to generate an accurate clock.

BRIEF DESCRIPTION OF THE DRAWINGS

FIGS. 8A through 8F are views showing the operation of each part of the apparatus shown in FIG. 4.

FIGS. 9A through 9F are views for explaining operations of correcting the phase of a sampling clock (v) utilizing a phase error signal (t).

FIGS. 12A through 12C illustrates a relationship between phases of a sampling clock.

FIG. 13 is a block diagram showing an example of clock generation means.

DETAILED DESCRIPTION OF THE PREFERRED EMBODIMENTS

Figure 4:
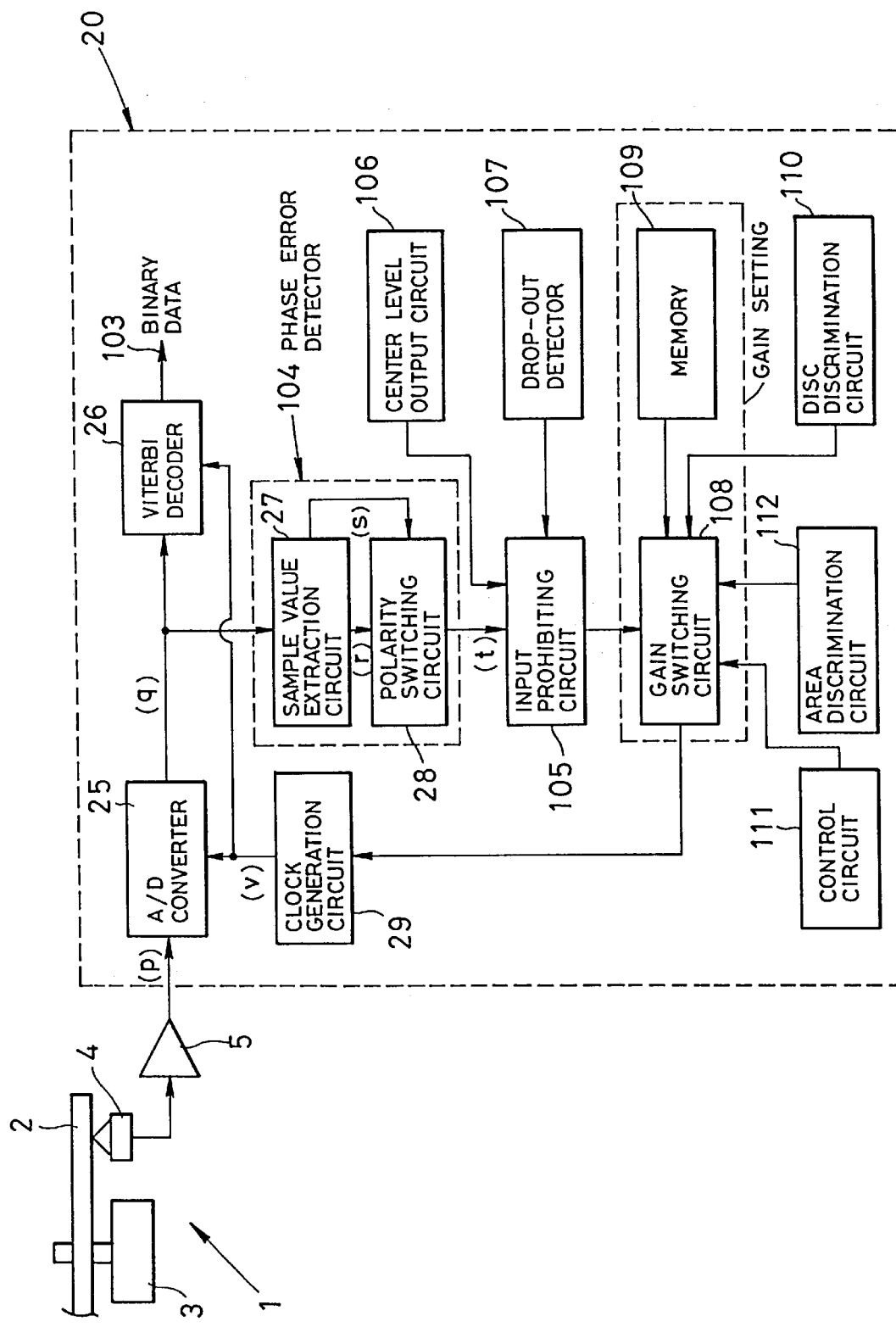
FIG. 4 is a block diagram showing an embodiment of the present invention.

FIG. 4 illustrates a configuration of a digital signal reproduction apparatus 20 according to the present invention. Referring to FIG. 4, an information reading device 1 comprises a spindle motor 3 for rotating an optical disc 2 on which digital information signals are recorded in a high density and a pick-up 4 for reading the information recorded on the optical disc 2 and for supplying a resultant read signal (p) to the digital signal reproduction apparatus 20.

The read signal (p) supplied by the information reading device 1 is supplied to an A/D converter 25 in the digital signal reproduction apparatus 20. The A/D converter 25 samples the read signal (p) at the timing of a sampling clock (v) supplied by a clock generation circuit 29 and supplies resultant sample values (q) to both a Viterbi decoder 26 and a sample value extraction circuit 27.

The Viterbi decoder 26 sequentially accepts the sample values (q) at each timing of the sampling clock (v) and observes the accepted sample values (q) as a series. The Viterbi decoder 26 outputs a series of decoded data which are most probable to exist in light of the series of input sample values, as a reproduction digital signal.

The sample value extraction circuit 27 extracts the sample value closest to a zero-level from among the sample values (q) supplied by the A/D converter 25 at each timing of the sampling clock (v) in a zero-crossing interval in which the samples (q) are in a transition from a positive value to a negative value or from a negative value to a positive value and supplies it to a polarity switching circuit 28 as an extracted sample value (r).

Further, the sample value extraction circuit 27 generates a gradient signal (s) indicating whether the extracted sample value (r) has been obtained during an upward transition of the sample values (q) or during a downward transition of the same and supplies it to the polarity switching circuit 28.

Figure 5:
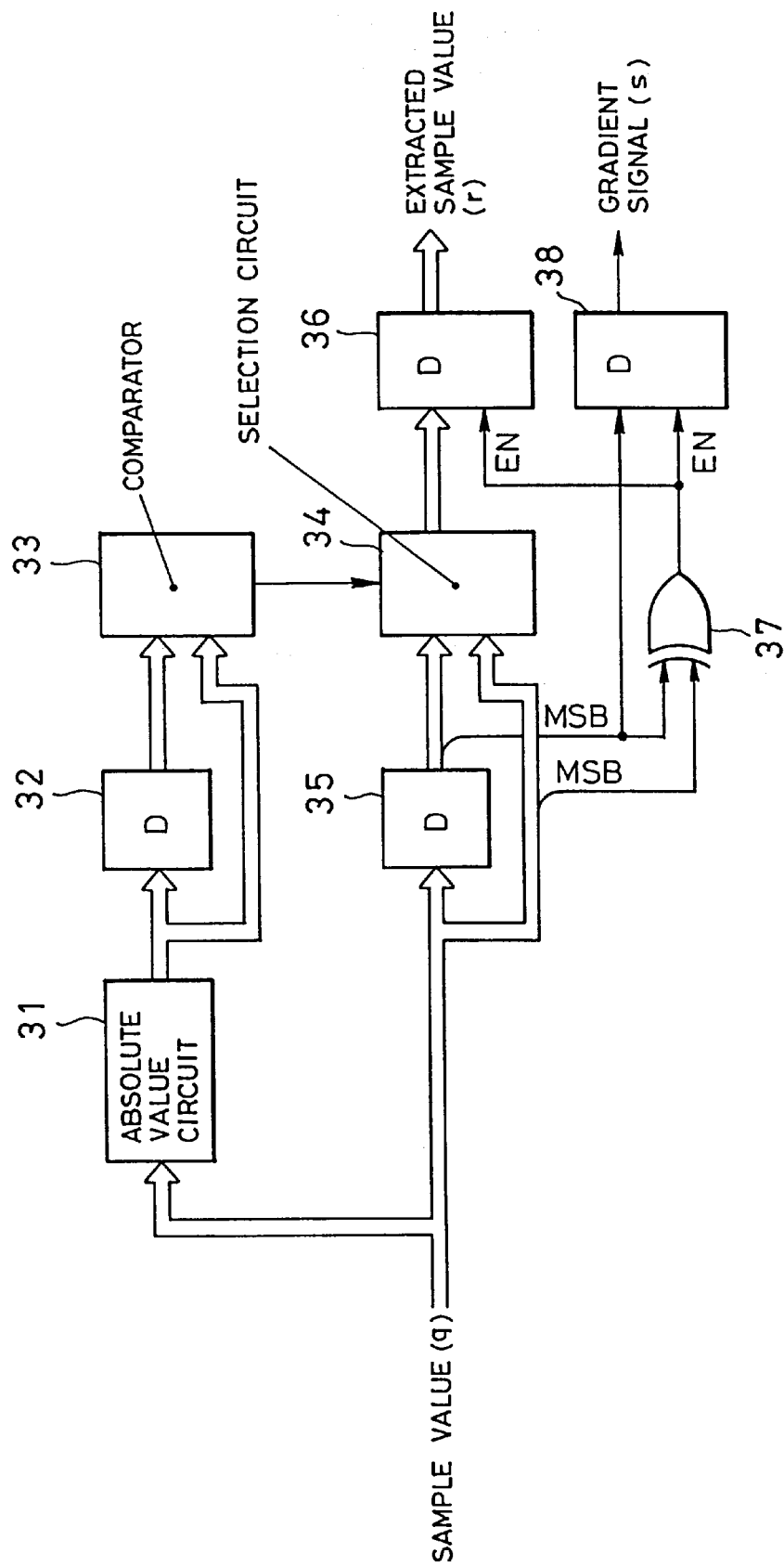
FIG. 5 is a block diagram showing an internal configuration of a sample value extraction circuit.

FIG. 5 illustrates an example of an internal configuration of the sample value extraction circuit 27.

Referring to FIG. 5, an absolute value circuit 31 obtains the absolute value of a sample value (q) supplied thereto and supplies it to each of a D-flip-flop 32 and a comparator 33 a sample absolute value. Although not shown, the D-flip-flop 32 is supplied with the sampling clock (v) at a clock terminal thereof and supplies the sample absolute value supplied by the absolute value circuit 31 to the comparator 33 at a delay corresponding to one sampling clock.

The comparator 33 compares the sample absolute value supplied by the absolute value circuit 31 with the sample absolute value supplied at a delay corresponding to one sampling clock and supplies a comparison result signal indicative of the result of such a comparison to a selection circuit 34. For example, when it is determined that the sample absolute value supplied by the absolute value circuit 31 is greater than the sample absolute value supplied at a delay corresponding to one sampling clock, the comparator 33 supplies a comparison result signal having a logical value "0" to the selection circuit 34. When it is determined that the sample absolute value supplied by the absolute value circuit 31 is smaller than the sample absolute value supplied at a delay corresponding to one sampling clock, the comparator 33 supplies a comparison result signal having a logical value "1" to the selection circuit 34. Although not shown, a D-flip-flop 35 is supplied with the sampling clock (v) at a clock terminal thereof and supplies a delayed sample value obtained by delaying sample value (q) supplied by the A/D converter 25 by an amount corresponding to one sampling clock to the selection circuit 34.

When the comparator 33 supplies the comparison result signal having a logical value "0", the selection circuit 34 supplies the delayed sample value delayed by the D-flip flop 35 by an amount corresponding to one clock cycle to a D-flip-flop 36. When the comparator 33 supplies the comparison result signal having a logical value "1", the sample value (q) supplied by the A/D converter 25 is supplied as it is to the D-flip-flop 36.

That is, the comparator 33 and selection circuit 34 compare two sample values (q) adjacent (in terms of the timing they are sampled) to each other among the series of sample values sequentially supplied by the A/D converter 25, select the one having the greater absolute value, and supply it to the D-flip-flop 36.

An exclusive OR circuit 37 supplies an enable signal having a logical value "1" to each of D-flip-flops 36 and 38 if the logical value of the MSB (most significant bit) of the sample value (q) does not agree with the logical value of the MSB of the delayed sample value delayed in the D-flip-flop 35 by an amount corresponding to one sampling clock. It supplies an enable signal having a logical value "0" to each of the D-flip-flops 36 and 38 if they have the same logical value. If the sample value (q) is in binary representation on an offset binary basis, the sample value (q) is a negative value when its MSB has the logical value "0", and the sample value (q) is a positive value when its MSB has the logical value "1". That is, disagreement between the logical values of the MSBs of the sample value (q) and the delayed sample value delayed in the D-flip-flop 35 by an amount corresponding to one sampling clock indicates that the sample value (q) is in a transition from a positive value to a negative value or from a negative value to a positive value, i.e., it is in a so-called zero-crossing state. The exclusive OR circuit 37 operates as zero-crossing detection means which supplies the enable signal having a logical value "1" to each of the D-flip-flops 36 and 38 when the zero-crossing state is detected.

The D-flip-flop 36 accepts the sample value supplied by the selection circuit 34 and outputs it as an extracted sample value (r) only when the enable signal having a logical value "1" is supplied thereto by the exclusive OR circuit 37.

The D-flip-flop 38 accepts the MSB of the delayed sample value supplied by the D-flip-flop 35 and outputs it as a gradient signal (s) only when the enable signal having a logical value "1" is supplied thereto by the exclusive OR circuit 37. If the sample value (q) is in a transition from a positive value to a negative value, i.e., if the sample value (q) is in a downward transition, the logical value of the gradient signal (s) is "1" and, if the sample value (q) is in a transition from a negative value to a positive value, i.e., if the sample value (q) is in an upward transition, the logical value of the gradient signal (s) is "0".

Next, the polarity switching circuit 28 shown in FIG. 4 supplies the extracted sample value (r) supplied by the sample value extraction circuit 27 as it is to the clock generation circuit 29 as a phase error signal (t) when the logical value of the gradient signal (s) is "0". When the logical value of the gradient signal (s) is "1", it supplies an inverted extracted sample value which is obtained by inverting the polarity of the extracted sample value (r) supplied by the sample value extraction circuit 27 to the clock generation circuit 29 as the phase error signal (t).

Figure 6:
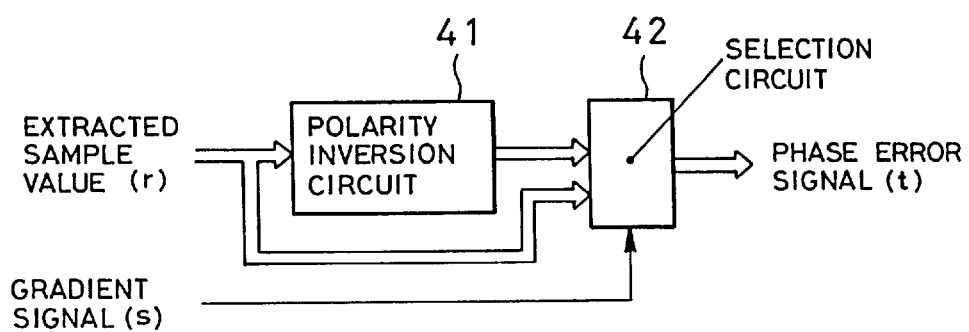
FIG. 6 is a block diagram showing an internal configuration of a polarity switching circuit.

FIG. 6 illustrates an example of an internal configuration of the polarity switching circuit 28.

Referring to FIG. 6, a polarity inversion circuit 41 inverts the polarity of extracted sample value (r) supplied by the sample value extraction circuit 27 and supplies the resultant value to a selection circuit 42. The polarity inversion circuit 41 inverts the polarity of the extracted sample value (r) by, for example, adding "1" to the extracted sample value (r) with the polarity of all bits thereof inverted. The selection circuit 42 selects the extracted sample value (r) and outputs it as the phase error signal (t) when the logical value of the gradient signal (s) supplied by the sample value extraction circuit 27 is "0". If the logical value of the gradient signal (s) is "1", it selects the sample value having the polarity inverted by the polarity inversion circuit 41 and outputs it as the phase error signal (t).

That is, the polarity switching circuit 28 supplies the extracted sample value (r) as it is to the clock generation circuit 29 through an input prohibiting circuit 105 and a gain switching circuit 108 as the phase error signal (t) when the sample value (q) is in an upward transition. When the sample value (q) is in a downward transition, it supplies the inverted extracted sample value obtained by inverting the polarity of the extracted sample value (r) to the clock generation circuit 29 through the input prohibiting circuit 105 and the gain switching circuit 108 as the phase error signal (t).

The clock generation circuit 29 generates a sampling clock (v) whose phase has been corrected based on the phase error signal (t) and supplies it to each of the A/D converter 25 and the Viterbi decoder 26.

Figure 7:
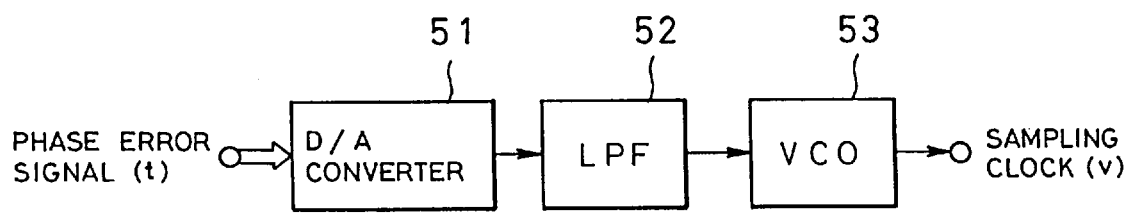
FIG. 7 is a block diagram showing an internal configuration of a clock generation circuit.

FIG. 7 illustrates an internal configuration of the clock generation circuit 29.

Referring to FIG. 7, a D-A converter 51 converts the phase error signal (t) into an analog voltage which is in turn supplied to an LPF (low-pass filter) 52. The LPF 52 takes an average of the analog voltage supplied thereto and supplies it to a VCO (voltage-controlled oscillator) 53. The VCO 53 outputs a sampling clock (v) having an oscillation frequency which corresponds to the average analog voltage supplied by the LPF 52.

FIGS. 8A through 8F are views showing an example of the operation of the digital signal reproduction apparatus 20 shown in FIGS. 4 through 7 as described above.

The read signal (p) shown in FIG. 8A is subjected to A/D conversion at each timing of the sampling clock (v) shown in FIG. 8B into a series of sample values $q_1$ through $q_{12}$ as shown in FIG. 8C.

First, the transition from a sample value $q_2$ to a sample value $q_3$ indicates a transition from a negative sample value to a positive sample value in the series of sample values $q_1$ through $q_{12}$. In this case, since the absolute value of the sample value $q_2$ is smaller than that of the sample value $q_3$, i.e., the sample value $q_2$ is closer to the zero-level, the sample value extraction circuit 27 outputs the sample value $q_2$ as the extracted sample value (r) as shown in FIG. 8D. Further, since the transition from the sample value $q_2$ to the sample value $q_3$ has an ascending tendency, the sample value extraction circuit 27 sets the logical value of the gradient signal (s) shown in FIG. 8E at "0". In this case, as shown in FIG. 8F, the polarity switching circuit 28 directly supplies the sample value $q_2$, i.e., the extracted sample value (r) to the clock generation circuit 29 as the phase error signal (t) because the logical value of the gradient signal (s) is "0".

Next, a transition from a positive sample value to a negative sample value is observed at the transition from a sample value $q_8$ to a sample value $q_9$. In this case, since the absolute value of the sample value $q_8$ is smaller than that of the sample value $q_9$, i.e., the sample value $q_8$ is closer to the zero-level, the sample value extraction circuit 27 outputs the sample value $q_8$ as the extracted sample value (r). Further, since the transition from the sample value $q_8$ to the sample value $q_9$ has a descending tendency, the sample value extraction circuit 27 sets the logical value of the gradient signal (s) at "1". In this case, the polarity switching circuit 28 supplies the sample value $q_8$, i.e., the extracted sample value (r), to the clock generation circuit 29 as the phase error signal (t) after inverting the polarity thereof because the logical value of the gradient signal (s) is "1".

Then, the clock generation circuit 29 generates a sampling clock (v) having a phase corrected based on the sample value $q_2$ and the sample value ($-q_8$).

A description will now be made with reference to FIGS. 9A through 9F on a phase correcting operation on the sampling clock (v) utilizing the phase error signal (t).

FIGS. 9A through 9C illustrate a phase correcting operation performed according to the three successive sample values $q_1$ through $q_3$ having an ascending tendency as shown in FIG. 8C. FIGS. 9D through 9F illustrate a phase correcting operation performed according to the three successive sample values $q_7$ through $q_9$ having a descending tendency as shown in FIG. 8C. The broken lines in FIGS. 9A through 9F indicate the positions where the timing of the sampling clock (v) generated by the clock generation circuit 29 takes place for a normal phase. The alternate long and short dash lines in those figures indicate the zero-level of the sample values.

First, FIG. 9A shows a case in which each of the sample values $q_1$ through $q_3$ is sampled at normal timing.

In this case, the sample value $q_2$ equal the zero-level. Therefore, the clock generation circuit 29 is supplied with the zero-level as the phase error signal (t). Then, the clock generation circuit 29 generates the sampling clock (v) with the current phase maintained.

Next, FIG. 9B shows a case in which each of the sample values $q_1$ through $q_3$ is sampled at timing which is earlier than the normal timing.

In this case, the sample value $q_2$ is a negative value below the zero-level. Therefore, a negative value which is smaller than the zero-level by the amount of the sample value $q_2$ is supplied to the clock generation circuit 29 as the phase error signal (t). Then, the clock generation circuit 29 generates the sampling clock (v) with a phase lag corresponding to the sample value $q_2$ to correct the phase lead of the clock.

Next, FIG. 9C shows a case in which each of the sample values $q_1$ through $q_3$ is sampled at timing which is delayed from the normal timing.

In this case, the sample value $q_2$ is a positive value above the zero-level. Therefore, a positive value which is greater than the zero-level by the amount of the sample value $q_2$ is supplied to the clock generation circuit 29 as the phase error signal (t). Then, the clock generation circuit 29 generates the sampling clock (v) with a phase lead corresponding to the sample value $q_2$ to correct the phase lag of the clock.

FIG. 9D shows a case in which each of the sample values $q_7$ through $q_9$ is sampled at normal timing.

In this case, the sample value $q_8$ equal the zero-level indicated by the alternate long and short dash line. The transition of the levels of the series of sample values $q_7$ through $q_9$ has a descending tendency. Therefore, a value obtained by inverting the polarity of the zero-level, i.e., the zero-level as it is, is supplied to the clock generation circuit 29 as the phase error signal (t). Then, the clock generation circuit 29 generates the sampling clock (v) with the current phase maintained.

Next, FIG. 9E shows a case in which each of the sample values $q_7$ through $q_9$ is sampled at timing which is earlier than the normal timing.

In this case, the sample value $q_8$ is a positive value above the zero-level. The transition of the levels of the series of sample values $q_7$ through $q_9$ has a descending tendency. Therefore, a signal obtained by inverting the polarity of the sample value $q_8$, i.e., a negative value which is smaller than the zero-level by the amount of the sample value $q_8$, is supplied to the clock generation circuit 29 as the phase error signal (t). Then, the clock generation circuit 29 generates the sampling clock (v) with a phase lag corresponding to the sample value $q_8$ to correct the phase lead of the clock.

Finally, FIG. 9F shows a case in which each of the sample values $q_7$ through $q_9$ is sampled at timing which is delayed from the normal timing.

In this case, the sample value $q_8$ is a negative value above the zero-level. The transition of the levels of the series of sample values $q_7$ through $q_9$ has a descending tendency. Therefore, a signal obtained by inverting the polarity of the sample value $q_8$, i.e., a positive value which is greater than the zero-level by the amount of the sample value $q_8$, is supplied to the clock generation circuit 29 as the phase error signal (t). Then, the clock generation circuit 29 generates the sampling clock (v) with a phase lead corresponding to the sample value $q_8$ to correct the phase lag of the clock.

The above-described polarity switching circuit 28 is configured such that it supplies an extracted sample value (r) as it is to the clock generation circuit 29 through the input prohibiting circuit 105 and the gain switching circuit 108 as the phase error signal (t) when the level of a series of sample values has an ascending tendency and such that it supplies an inverted extracted sample value obtained by inverting the polarity of an extracted sample value (r) to the clock generation circuit 29 through the input prohibiting circuit 105 and the gain switching circuit 108 as the phase error signal (t) when the level of a series of sample value has a descending tendency. However, such a condition for polarity inversion may be appropriately set depending the method of signal processing employed in the clock generation circuit 29.

Figure 10:
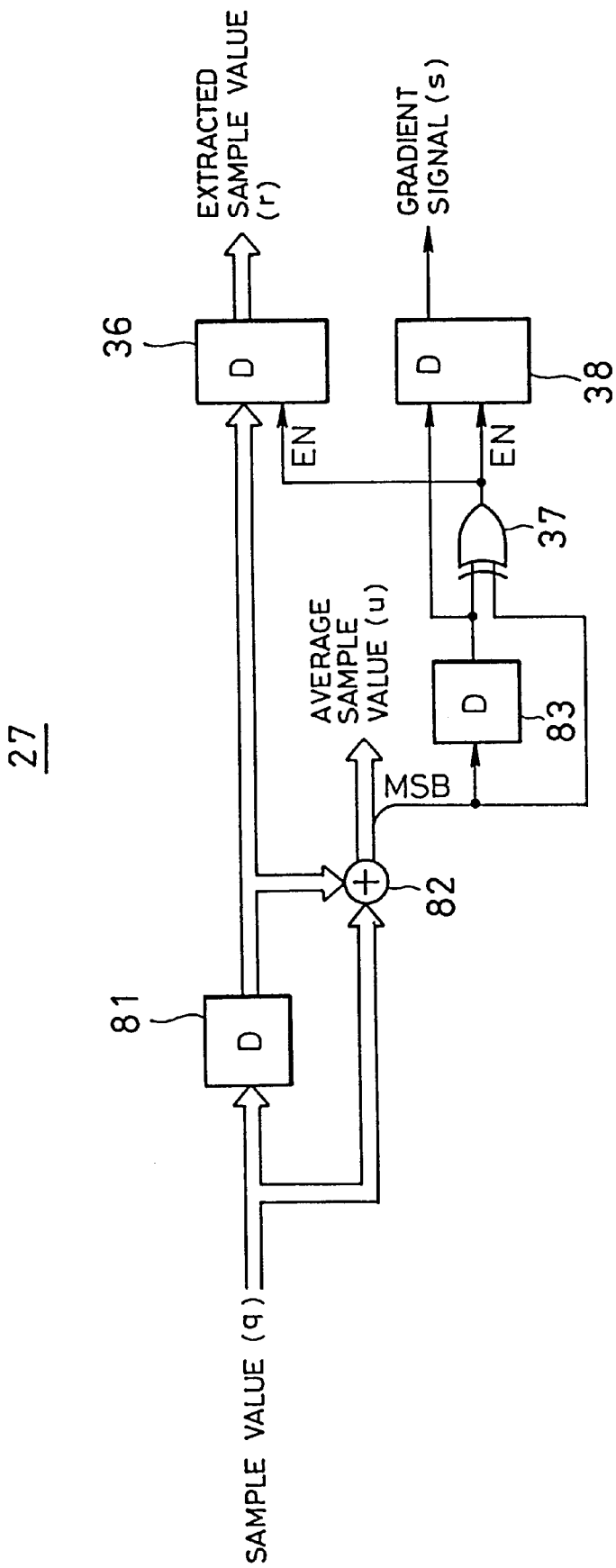
FIG. 10 is a block diagram showing another example of the internal configuration of the sample value extraction circuit.

For example, while an example of the internal configuration of the sample value extraction circuit 27 is shown in FIG. 5, a sample value extraction circuit 27 having an internal configuration as shown in FIG. 10 may be used instead.

Figure 11:
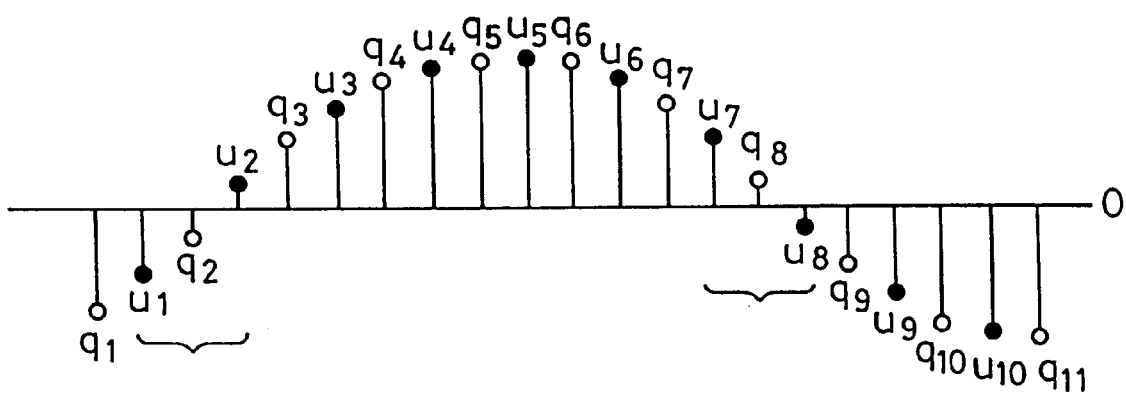
FIG. 11 illustrates examples of a sample value (q) and an average sample value (u).

Referring to FIG. 10, an adder 82 adds a sample value (q) supplied by an A/D converter 25 and a delayed sample value which has been delayed by an amount corresponding to one sampling clock by a D-flip-flop 81. Through the addition, the adder 82 obtains an average sample value (u) for every two adjacent sample values (q) as shown in FIG. 11. In FIG. 11, sample values (q) and average sample values (u) are indicated by white circles and black circles, respectively. The series of average sample values (u) represents linear interpolation applied to the series of sample values (q).

FIG. 4 is a block diagram showing a configuration according to an embodiment of the present invention. Referring to FIG. 4, a signal read by the pick-up 4 from an optical disc 2 rotated by a spindle motor 3 is amplified by the amplifier 5 and sampled by the A/D converter 25 at a clock supplied by the clock generation circuit 29 to be converted into a digital form. A digital signal is obtained by a phase error detector 104, and a phase error signal is obtained from a series of sample value of the digital signal.

The output of the phase error detector 104 is supplied to one of the inputs of the input prohibiting circuit 105, and a reference level is input from a center level output circuit 106 to another input of the input prohibiting circuit 105. Further, a drop-out detection signal from a drop-out detector 107 is input to a control input of the input prohibiting circuit 105. In a period of drop-out, the input prohibiting circuit 105 outputs the signal from the center level output circuit 106 instead of the phase error signal (t). Thus, the phase error signal (t) is prohibited from being input to the gain switching circuit 108 and clock generation circuit 29 in a period of drop-out.

Next, in gain setting means constituted by the gain switching circuit 108 and a memory 109, the memory 109 stores the optimum gain for each of the states of disc type discrimination means 110 which is media type detection means, control means 111 for designating a reading layer for multi-layer discs, and area discrimination means 112 for discriminating recording areas, and the gain switching circuit 108 performs switching to select an appropriate gain for a phase error signal from the input prohibiting circuit 105 according to a control signal from the control means 111.

The phase error signal processed by the gain switching circuit 108 to have the optimum gain is supplied to the clock generation circuit 29 which in turn generates a clock having a phase corrected to be optimum and supplies it to the A/D converter 25. The output of the A/D converter 25 is input to a Viterbi decoder 26 which supplies binary data decoded on a Viterbi basis to an output 103.

Figure 15:
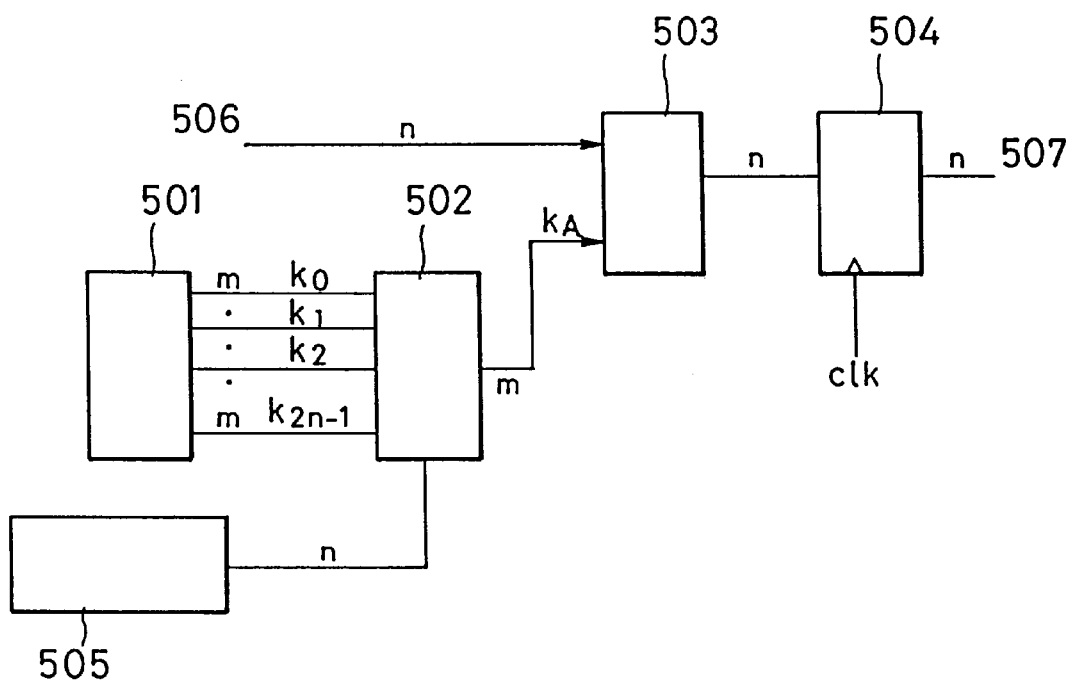
FIG. 15 is a block diagram showing a configuration of gain setting means.
Figure 16:
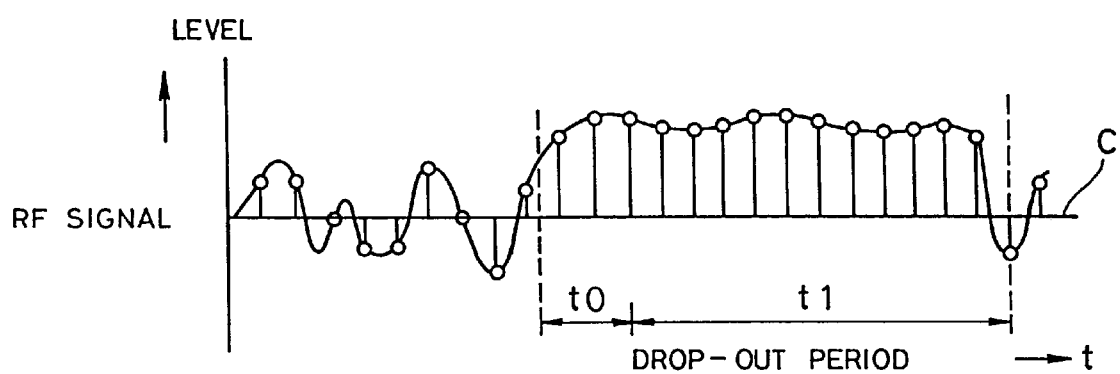
FIG. 16 illustrates a drop-out period.

As described above, it is intended by the present invention to perform control such that the optimum clock is output by providing a phase error signal with a predetermined gain selectively. FIG. 15 is a block diagram of the gain setting means. Referring to FIG. 15, a memory circuit 501 represents optimum gains $k_0, k_1, \ldots, k_{2n-1}$ which are defined taking multi-layer discs, disc types and the state of each recording area into consideration using m bits, and a system controller 505 and a selection circuit 502 select one gain $k_A$ from among the gains $k_0, k_1, \ldots, k_{2n-1}$ based on the state of the current read signal and input it to one of the inputs of a multiplier 503.

A phase error signal consisting of n bits is input to another input 506 of the multiplier 503, and the result of multiplication consisting of n bits is sent from the multiplier 503 to a D-flip-flop 504 to be latched therein. A phase error signal having the optimum gain consisting of n bits is output from an output 507 of the D-flip-flop 504. The element 501 in FIG. 15 corresponds to the memory 109 in FIG. 4, and the elements 502 through 505 correspond to the gain switching circuit 108 in FIG. 4.

As previously mentioned, in a reproduction apparatus according to the present invention, a read signal read from a disc is sampled by an A/D converter at a sampling clock to provide a series of sample values. A method in which a phase error signal is obtained from a series of sample values to switch the gain allows delay and shock at the time of the gain switching to be eliminated to generate an accurate clock.

Referring to the operation specifically, a signal read from a disc is converted into sample values (q) by the A/D converter 25 and, thereafter, a phase error signal (t) is generated by the phase error detector 104. The phase error signal (t) is supplied to the gain switching circuit 108 through the input prohibiting circuit 105. Further, the disc type discrimination means 110 determines whether the disc being played is a CD or CD-R based on whether a wobble signal is included in the read signal. Since a wobble signal is present on a CD-R but not on a CD, a disc can be determined as a CD-R if a wobble signal is detected and as a CD is no wobble signal is detected.

For example, when a wobble signal is detected from a read signal, the disc type discrimination means 110 determines that the disc is a CD-R and supplies a disc type signal indicating a CD-R to the gain switching circuit 108. The gain switching circuit 108 reads a gain for CD-Rs from the memory 109 based on the disc type signal and provides the input phase error signal (t) with that gain.

A gain phase error signal which represents a phase error with a gain applied thereto is input to the clock generation circuit 29 which in turn generates a clock based on the gain phase error signal. Similarly, when the disc being played is a CD, a gain for CDs is supplied to the phase error signal (t). Further, since the reproduction waveform of a CD-R is smaller than that of a CD as a natural result of the characteristics thereof, the gain for CD-Rs stored in the memory 109 is set at a value higher than that for CDs.

A description will now be made on the operation of providing a phase error signal with a gain. The sample value closest to the center level is extracted from a series of sample values. The extracted data is inverted with respect to the center level or left as it is depending on whether it is in an upward or downward transition to provide a phase error signal. The optimum gain is selected by the gain setting means from among a plurality of gain set values to convert the phase error signal into a signal having the predetermined gain.

Examples will now be shown in FIGS. 12A through 12C on various operations in a case wherein the phase of a sampling clock leads that of a read signal. As shown in FIG. 12A, when the phase of a sampling clock leads that of a read signal or a series of sample values, the phase error detection means inverts the sample value closest to the center level or leaves as it is to provide a phase error signal, which results in the state as shown in FIG. 12B.

If the gain of the phase error signal is switched from a double gain to a single gain, an optimum gain phase error signal as shown in FIG. 12C is obtained after the gain switching. The sampling clock which has been subjected to phase correction utilizing the optimum gain phase error signal thus obtained is delayed in phase into a relationship phase-synchronized with the read signal.

When a drop-out is caused by a scratch, fingerprint or the like on the disc, the read signal will be different from a normal signal. A series of sample values obtained by sampling such an abnormal analog signal will be also abnormal. An attempt to eliminate any phase error signal at the time of a drop-out in a continuous control system will fail to eliminate it accurately because of switching noises and the like. This means that no accurate clock can be provided.

Figure 14:
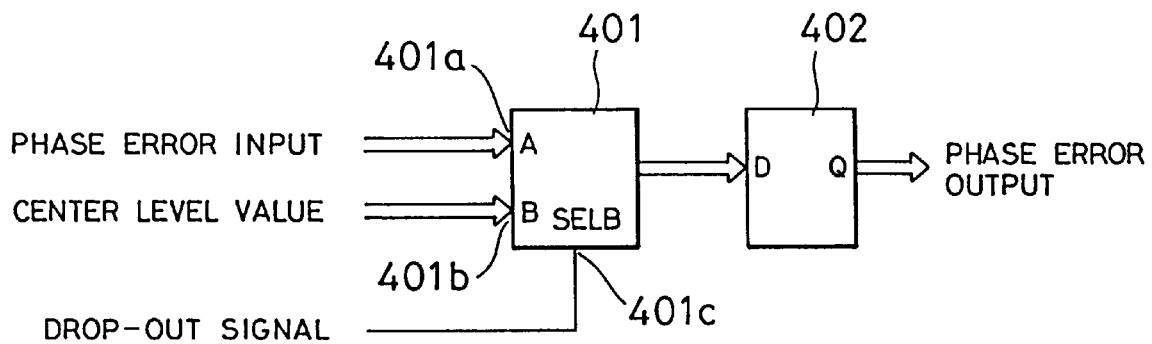
FIG. 14 is a block diagram showing a configuration of phase error signal selection means.

A discrete control system can easily and accurately eliminate a series of abnormal sample values at the time of a drop-out using the input prohibiting circuit 105 for which an internal block diagram is shown in FIG. 14. Referring to FIG. 14, a selection means 401 selects either a phase error signal input at an input A (401*a*) or a center level value at an input B (401*b*) in accordance with a drop-out detection signal input to a control input 401*c* thereof. When a drop-out has occurred, it selects the center level value at the input B and, no drop-out has occurred, it selects the phase error signal input at the input A. A D-flip-flop 402 is for latching data, and a signal latched therein is output as a phase error signal.

Referring to FIG. 4, a drop-out is detected by the drop-out detector 107 which is drop-out detection means. Methods of detection include the method shown in FIG. 15 wherein zero-crossing of an RF signal is detected; it is determined that a drop-out has occurred if no zero-crossing occurs for a predetermined period $t_0$; and a drop-out detection signal is output for a period $t_1$. The drop-out detection signal from the drop-out detector 107 is input to the control input of the input prohibiting circuit 105, and the signal from center level output circuit 106 is output instead of the phase error signal during the period of a drop-out to eliminate the influence of a series of abnormal sample values.

For a multi-layer disc, a configuration is employed in which gains are switched depending on the layers of the disc. For example, the first layer of a two-layer disc which is closer to a pick-up is formed by a semi-transmissive film unlike a totally reflecting on the second layer on the further end, and an information reading signal from the second layer normally has a signal level higher than that of an information reading signal from the first layer. It is therefore necessary to set a higher gain for reading for the first layer than that for the second layer.

The control means Ill for designating a layer to be read in a multi-layer disc outputs a control signal indicative of a layer to be read to the gain switching circuit 108. Based on the information designating the first or second layer included in the control signal, the gain switching circuit 108 reads an appropriate gain set for each layer in advance from the memory 109 and switches and sets the gain of the phase error signal from the input prohibiting circuit 105.

Specifically, a signal read from a disc is converted by the A/D converter 25 into sample values (q) and, thereafter, a phase error signal (t) is generated by the phase error detector 104. The phase error signal (t) is supplied to the gain switching circuit 108 through the input prohibiting circuit 105. The control means 111 supplies a control signal indicating which of the first and second layers is to be read to the gain switching circuit 108. For example, if the second layer is read, a control signal designating the second layer is output to the gain switching circuit 108. Based on this control signal, the gain for the second layer is read from the memory 109 and is provided to the input phase error signal (t).

The gain phase error signal which is a phase error having a gain applied thereto is input to the clock generation circuit 29, and a clock is generated based on the gain phase error signal. Similarly, when the first layer is read, the gain for the first layer is provided to the phase error signal (t). Further, since the level of the signal read from the first layer is lower than the signal read from the second layer as described above, the gain for the first layer stored in the memory 109 is higher than the gain for the second layer.

Figure 1:
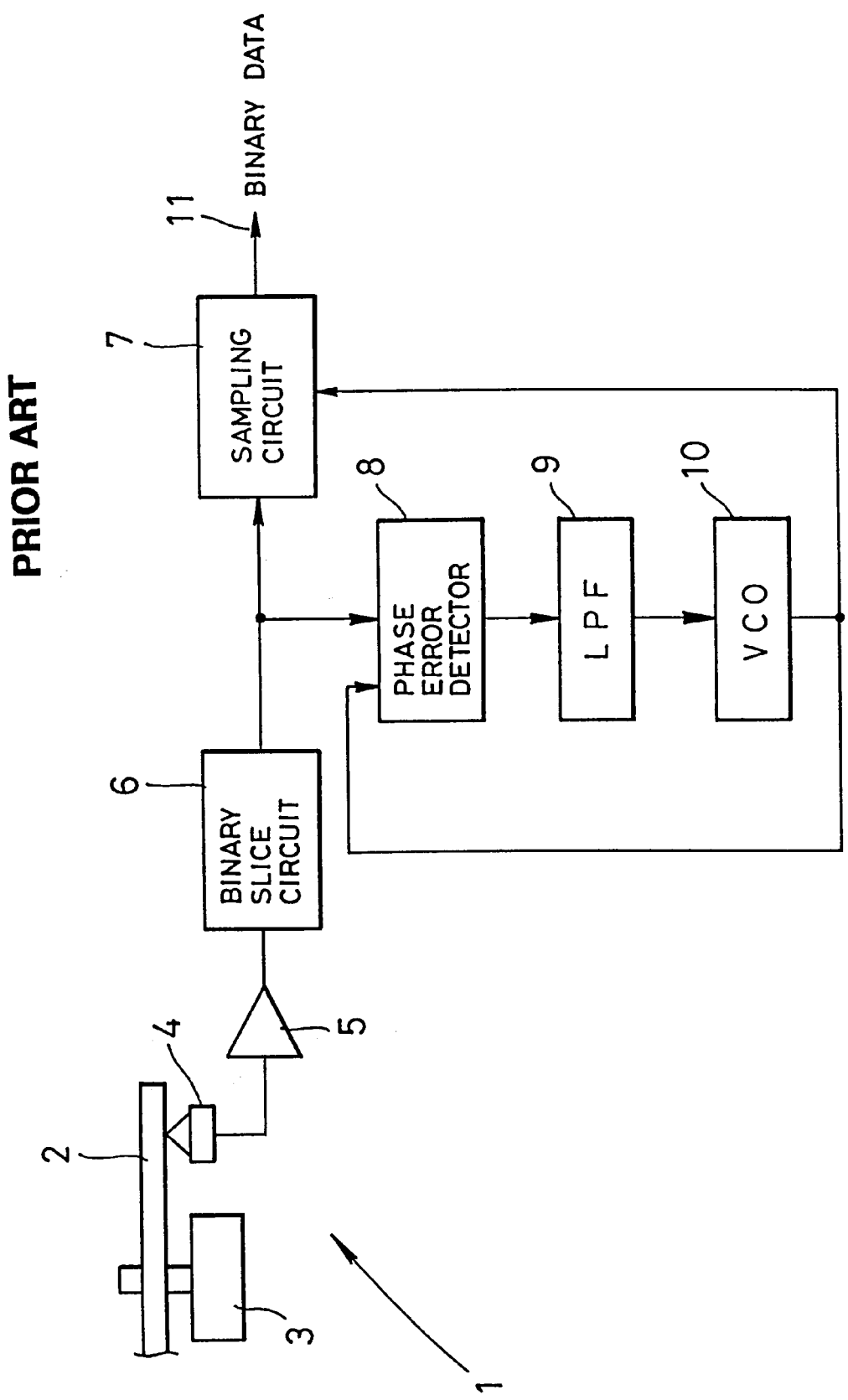
FIG. 1 shows conventional clock generation means.
Figure 2:
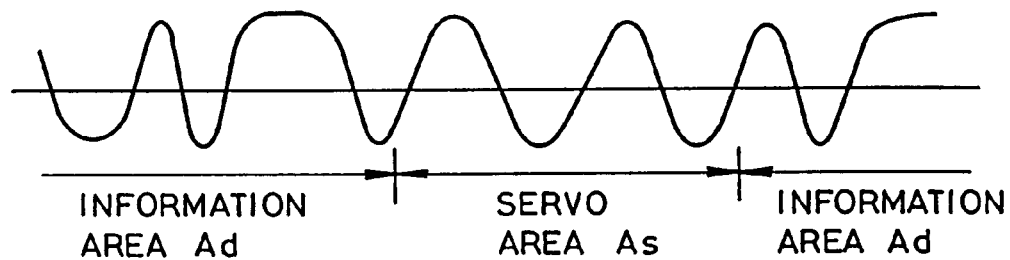
FIG. 2 is a signal waveform diagram for a divided recording area.

As described above, some discs have a recording area divided into areas and are configured such that information areas and servo areas are alternately provided (see FIG. 2). For example, on a reloadable disc, tracking servo and PLL servo are implemented by setting servo areas in advance and digital data is stored in or reproduced from information areas.

Such a disc has predetermined pits formed in the servo areas to allow a clock to be adjusted accurately in such areas, information reading being carried out in the information areas.

It is necessary in the information areas to prevent noises and drop-outs from severely affecting a PLL to cause a fluctuation of the same. In servo areas, a PLL must be quickly controlled to quickly achieve phase locking in order to achieve accurate clock synchronization even when the clock fluctuates.

For this reason, the gain in the servo areas is increased to obtain quicker PLL response. In the information areas, a somewhat low gain is set to achieve slow response. A configuration is employed in which the gain for each area is stored in memory means and in which the gains are switched depending on the area to be read. Those areas can be discriminated from each other by measuring time using a counter because those areas are set in predetermined positions.

The optimum gain for each of states determined by area discrimination means 112 for discriminating recording areas is stored in the memory 109, and the gain switching circuit 108 switches and selects an appropriate gain for a phase error signal from the input prohibiting circuit 105 according to the result of the discrimination by the area discrimination means 112.

Specifically, a signal read from a disc is converted into sample values (q) by the A/D converter 25, and a phase error signal (t) is generated by the phase error detector 104. This phase error signal (t) is supplied to the gain switching circuit 108 through the input prohibiting circuit 105. The area discrimination means 112 uses the counter incorporated therein to measure time in order to discriminate the servo areas and information areas from each other. This technique allows the areas to be discriminated because each area is set in a predetermined position on the disc.

Then, the area discrimination means 112 outputs an area discrimination signal to the gain switching circuit 108 based on the result of discrimination. For example, when a servo area is read, an area discrimination signal indicative of the servo area is supplied to the gain switching circuit 108. The gain switching circuit 108 reads the gain for the servo area from the memory 109 based on the area discrimination signal and provides the gain to the input phase error signal (t). A gain phase error signal obtained by providing the gain error signal with that gain is input to the clock generation circuit 29 which in turn generates a clock based on the gain phase error signal.

If an information area is read, the gain for the information area is similarly supplied to the phase error signal (t).

Further, in order to achieve higher PLL response in the servo areas than in the information areas, the value of the gain for the servo areas stored in the memory 109 is set higher than that for the information areas.

Figure 3:
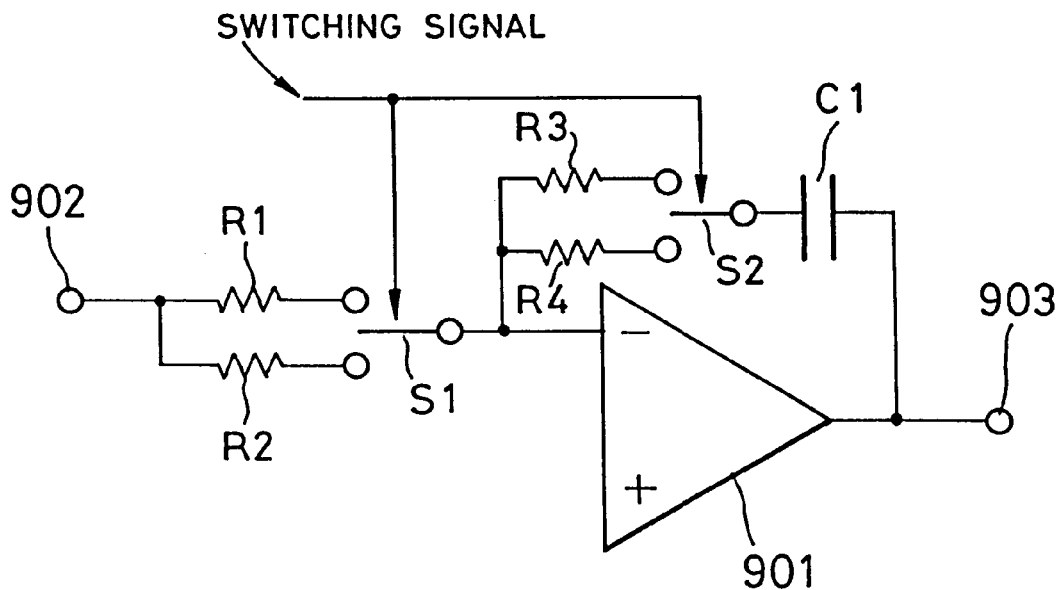
FIG. 3 is a diagram showing a conventional loop gain switching circuit.

Meanwhile, in the case of gain switching in a continuous control system, since each of elements such as R1, R2, R3 and R4 shown in FIG. 3 has an error, a desired gain will not be obtained. In a discrete control system, however, gains can be quite accurately set. In the configuration shown in FIG. 13 as an example of the clock generation means, employing a D-A converter 301, an LPF 302 and a VCO 303, the above-described technique allows gain switching to be performed in a range wider than that available when gain switching is performed by the LPF 302 on an input voltage from the VCO 303.

The present invention may be implemented in various circuit configurations other than those described above. For example, in the clock generation means shown in FIG. 3, a PWM circuit may be used instead of the D-A converter 301 to generate a pulse having a pulse width in accordance with a phase error signal and an average voltage of the pulse may be obtained using the LPF 302.

Although a phase error may be detected as previously described when the LPF is implemented using a noninverting integration circuit, if the LPF is implemented using an inverting integration circuit, a circuit configuration can be employed in which a phase error signal is obtained based on the inversion and non-inversion of such a circuit for data extracted from sample values in ascending and descending transitions.

In addition, the LPF may be configured as a discrete control system. Alternatively, both of discrete and continuous control systems may be used in combination. Referring to the method of eliminating a value in the period of a drop-out, switching may be performed to use a value stored immediately before the drop-out.

Although the above-described embodiment referred to an example wherein a gain adapted to a CD or CD-R is supplied to a phase error signal, the present invention is not limited thereto and may be applied to discs of other types such as DVDs (digital video discs). Furthermore, although an example was shown wherein gains adapted to first and second recording layers are supplied, the present invention is applicable to discs having three or more recording layers. Moreover, although an example was shown wherein gains adapted to two areas, i.e., servo and information areas are supplied, the present invention may be applied to discs which are divided into areas of three or more kinds.

As described above, a reproduction apparatus according to the present invention converts a reproduction read signal read from a disc into a digital form and obtains a phase error signal from a series of sample values of the digital signal. This eliminates any delay and chock associated with gain switching to allow an accurate clock to be generated.

Further, since gains are set in a discrete control system, the gains can be quite accurately set in comparison to those available with a continuous control system.

Furthermore, the use of a D-A converter, an LPF and a VCO as clock generation means allows gain switching to be performed in a range wider than that in performing gain switching on a VCO input voltage at the LPF.

The optimum gain can be immediately set through switching between gains stored in the gain setting means for respective disc types, recording layers and recording areas.

In addition, since the processing is performed in a discrete control system, a series of abnormal sample values can be easily and accurately eliminated when a drop-out occurs.

Although a preferred embodiment of the invention has been illustrated and described, it is readily understood by those skilled in the art that various modifications may be made therein without departing from the spirit of the invention or from the scope of the appended claims.

What is claimed is:

1. An apparatus for reproducing a digital signal based on a signal read from a recording medium on which the digital signal is recorded, comprising:

reading means for reading a signal from said recording medium;

an Analog to Digital converter for sequentially sampling said read signal in response to a sampling clock to convert the sampled signal into a series of sampled values;

decoding means for decoding said series of sample values to output a reproduced digital signal;

phase error detection means for detecting a phase error from said series of sample values;

a recording medium discrimination circuit for detecting characteristics of the recording medium and outputting a recording medium type signal;

memory means for storing a predetermined gain;

gain setting means for outputting a gain phase error signal based on said phase error, said predetermined gain, and in part on said recording medium type signal; and clock generation means for generating a clock signal which has been subjected to phase correction based on said gain phase error signal as said sampling clock.

2. An apparatus for reproducing a digital signal based on a signal read from a recording medium on which the digital signal is recorded, comprising:

reading means for reading a signal from said recording medium;

an Analog to Digital converter for sequentially sampling said read signal in response to a sampling clock to convert the sampled signal into a series of sampled values;

decoding means for decoding said digital signal based on said series of sample values to output a reproduced digital signal;

phase error detection means for detecting a phase error from said series of sample values;

memory means for storing a predetermined gain;

gain setting means for outputting a gain phase error signal by providing said phase error with said predetermined gain; and clock generation means for generating a clock signal which has been subjected to phase correction based on said gain phase error signal as said sampling clock drop-out detection means for detecting a drop-out; and input prohibiting means for prohibiting the input of said phase error obtained from said series of sample values at the time of a drop-out to said clock generation means when the drop-out is detected.

3. An apparatus according to claim 1, wherein said recording medium discrimination circuit comprises medium type detection means for detecting the type of said recording medium, wherein said memory means holds said predetermined gain in accordance with the type of said recording medium, and wherein said gain setting means provides said phase error with said predetermined gain corresponding to the type of said recording medium.

4. An apparatus according to claim 1, wherein:

said recording medium includes a plurality of recording layers;

wherein said recording medium discrimination circuit comprises recording layer detection means for detecting a recording layer of said recording medium from which a signal is read, said memory means holds said predetermined gain in accordance with said recording layers of said recording medium; and said gain setting means provides said phase error with said predetermined gain corresponding to the recording layer of said recording medium from which a signal is read.

5. An apparatus according to claim 1, wherein:

said recording medium includes a plurality of areas;

wherein said recording medium discrimination circuit comprises area detection means for detecting an area of said recording medium from which a signal is read, said memory means holds said predetermined gain in accordance with said areas of said recording medium; and said gain setting means provides said phase error with said predetermined gain corresponding to the area of said recording medium from which a signal is read.

6. An apparatus for reproducing a digital signal based on a signal read from a recording medium on which the digital signal is recorded, comprising:

a signal reader for reading a signal from said recording medium;

an Analog to Digital converter for sequentially sampling said read signal in response to a sampling clock to convert the sampled signal into a series of sampled values;

a decoder for decoding said series of sample values to output a reproduced digital signal;

a phase error detector for detecting a phase error from said series of sample values;

a recording medium discrimination circuit for detecting characteristics of the recording medium and outputting a recording medium type signal;

a memory for storing a predetermined gain;

a gain setting mechanism for outputting a gain phase error based on said phase error, said predetermined gain, and in part on said recording medium type signal; and a clock generator for generating a clock signal which has been subjected to phase correction based on said gain phase error signal as said sampling clock.

7. An apparatus for reproducing a digital signal based on a signal read from a recording medium on which the digital signal is recorded, comprising:

a signal reader for reading a signal from said recording medium;

an Analog to Digital converter for sequentially sampling said read signal in response to a sampling clock to convert the sampled signal into a series of sampled values;

a decoder for decoding said series of sample values to output a reproduced digital signal;

a phase error detector for detecting a phase error from said series of sample values;

a recording medium discrimination circuit for detecting characteristics of the recording medium and outputting a recording medium type signal;

a memory for storing a predetermined gain;

a gain setting mechanism for outputting a gain phase error based on said phase error, said predetermined gain, and in part on said recording medium type signal; and a clock generator for generating a clock signal which has been subjected to phase correction based on said gain phase error signal as said sampling clock a drop-out detector for detecting a drop-out; and an input prohibiter for prohibiting the input of said phase error obtained from said series of sample values at the time of a drop-out to said clock generator when the drop-out is detected.

8. An apparatus for reproducing a digital signal based on a signal read from a recording medium on which the digital signal is recorded, comprising:

a signal reader for reading a signal from said recording medium;

an Analog to Digital converter for sequentially sampling said read signal in response to a sampling clock to convert the sampled signal into a series of sampled values;

a decoder for decoding said series of sample values to output a reproduced digital signal;

a phase error detector for detecting a phase error from said series of sample values;

a recording medium discrimination circuit for detecting characteristics of the recording medium and outputting a recording medium type signal;

a memory for storing a predetermined gain;

a gain setting mechanism for outputting a gain phase error based on said phase error, said predetermined gain, and in part on said recording medium type signal; and a clock generator for generating a clock signal which has been subjected to phase correction based on said gain phase error signal as said sampling clock, wherein said phase error detector comprises a sample value extraction circuit which determines an extracted sample value and a gradient signal from said series of sample values and a polarity switching circuit that outputs said phase error from said extracted sample value and said gradient signal.

9. An apparatus according to claim 8, wherein said sample value extraction circuit also determines an average sample value.

* * * * *